Oct. 25, 1966  M. L. SHOWNES  3,281,195

FEMININE HYGIENE CABINET

Filed July 29, 1965

INVENTOR:
MILDRED LOUISE SHOWNES

By Gravely, Lieder & Woodruff
ATTORNEYS.

United States Patent Office 3,281,195
Patented Oct. 25, 1966

3,281,195
FEMININE HYGIENE CABINET
Mildred L. Shownes, 2504 Shannon, Jennings, Mo.
Filed July 29, 1965, Ser. No. 475,771
6 Claims. (Cl. 312—209)

This invention relates to a feminine hygiene cabinet and more particularly to a feminine hygiene cabinet provided with a specialized interior including a water supply, a utility bowl, and shelves and trays for various paraphernalia associated with feminine hygiene.

Previously, cabinets for storing and using feminine hygiene paraphernalia have not been provided as a single compact cabinet.

The present invention provides a compact cabinet having water supply facilities, a mixing or irrigation vessel or bowl adapted to be retained under the water supply faucet. The bowl has a drain spout extending outwardly near the bottom of the bowl for connecting to tubes and pipes. A holder removably retains the bowl in the cabinet, permitting rotation of the bowl to utilize the tubes and pipes yet prevent the bowl from accidentally falling out of the cabinet. Also, the holder for the bowl is cut away to permit removal of the bowl when the drain spout is oriented to a slot provided for that purpose. Several tubes and trays are removably provided in the cabinet. Likewise, compartments for various sanitary products are provided in the cabinet. Also, removable trays for holding and measuring articles are provided. Optionally, additional shelving may be provided in the cabinet to permit convenient storage of towels, etc.

It is therefore an object of the invention to provide a feminine hygiene cabinet which includes various apparatus at a central location for complete feminine hygiene;

It is another object of the invention to provide a cabinet outfitted with the essential apparatus including water facilities in a centralized location for all sanitary products and paraphernalia associated with feminine hygiene;

It is a further object of the invention to provide a cabinet having a water supply faucet and controls mounted on the rear wall of the cabinet and having a combined mixing bowl and irrigation vessel removably retained under the faucet by a holder member which facilitates limited rotational movement of the bowl to permit ready access to the irrigation tubes and pipes, as well as compartments in another location of the cabinet for storage of personal products for feminine hygiene, and additional shelving for storing hand towels, etc.;

It is a further object of the invention to provide a cabinet for conveniently providing water supply facilities and apparatus as well as sanitary products in a centralized location which is readily accessible and convenient for supplying complete feminine hygiene facilities and products.

Other objects and advantages of the invention will become readily apparent from the ensuing description taken in conjunction with the appended claims and the drawings wherein:

Figure 1:
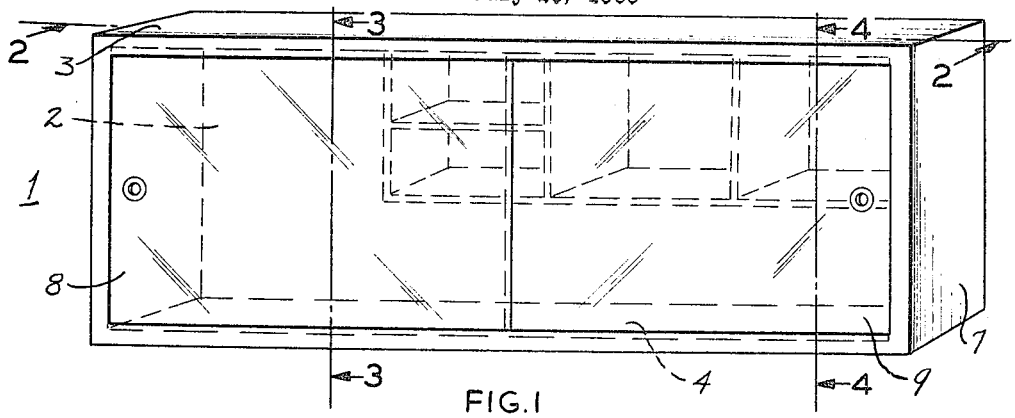
FIG. 1 illustrates in perspective the complete feminine hygiene cabinet.

Referring to the drawings, the feminine hygiene cabinet 1 has a rear wall 2, a top wall 3, a bottom wall 4 and side walls 6 and 7. The cabinet is provided with sliding doors 8 and 9 which move from one side to the other for purposes later described.

At one side of the cabinet 1 a water faucet 10, which operates as a mixing valve, is mounted to rear wall 2. Adjacent the faucet is a hot water control 11 and a cold water control 12. On the bottom wall beneath faucet 10 is a holder 13. The holder has a cut-away portion forming a bottom slot 14 extending around the bottom periphery of the holder from the front edge 15 to the side 16. The upper periphery 17 of the holder 13 has a vertical slot 18 communicating with the bottom slot 14. An irrigation bowl 19 having a relatively flat bottom 20 and having a drain spout 21 extending outwardly from the side wall of the bowl 19 near the bottom thereof. The bowl is removably positioned in the holder 13 with the drain spout 21 projecting through the bottom slot 14. On the bottom wall 4 of the cabinet 1 adjacent the bowl 19 is a removable tube and pipe tray 22 for holding an irrigation tube 23 and nozzle 24. The tube 23 is connected to the drain spout and a metal clamp is provided to permit flow from the bowl into the tube as desired. An additional tube and pipe tray 22a is provided adjacent tube and pipe tray 22 for purpose of storing additional sanitary paraphernalia. Also, an article holder tray 25 is provided for measuring spoons, stirrers, etc. It will be understood that trays 22, 22a and 25 may be seated, if desired, in a recess (not shown) formed in bottom wall 4.

Figure 2:
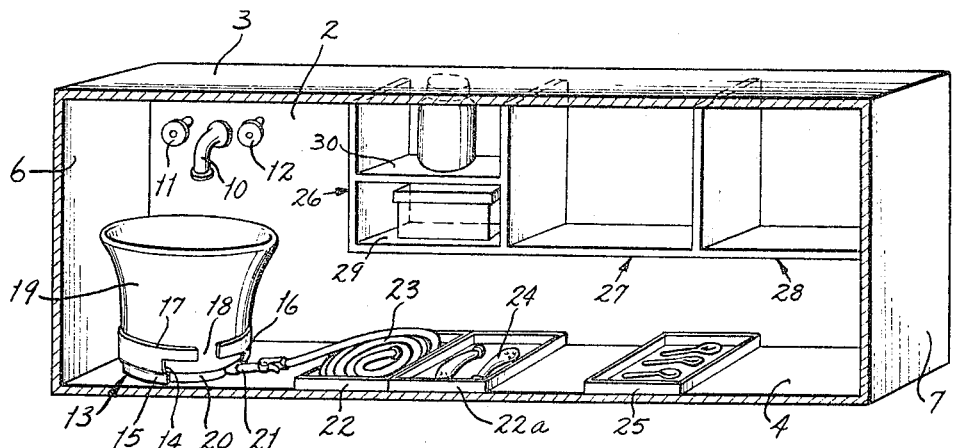
FIG. 2 is a cross-sectional view taken along the line 2—2 of FIG. 1.
Figure 3:
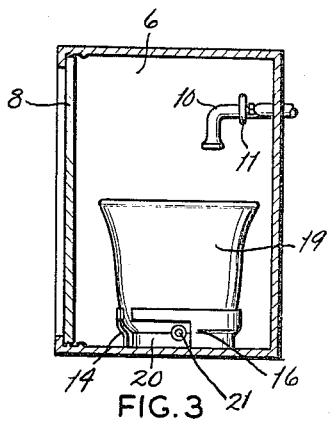
FIG. 3 is a cross-sectional view taken along the line 3—3 in FIG. 1, illustrating the water supply and facility and bowl holder arrangement of the invention.
Figure 4:
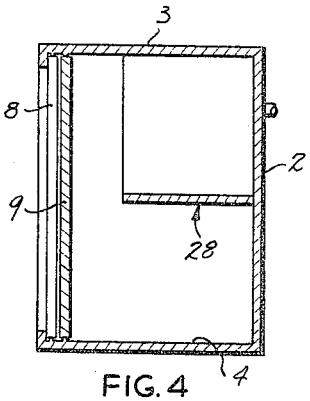
FIG. 4 is a cross-sectional view taken along the line 4—4 in FIG. 1 illustrating the compartment arrangement of the feminine hygiene cabinet.

Three compartments 26, 27 and 28 are provided extending from the side wall 7 in the upper portion of the cabinet extending over about two-thirds of the length of the cabinet and terminating adjacent the water faucet and bowl over top of the trays 22 and 25. The compartment 26 in the cabinet has lower shelf 29 and upper shelf 30. The lower shelf is a convenient size for suppositories and the upper shelf is of convenient size for douche powders. The compartments 28 and 29 are for storage of towels or the like. The sanitary personal hygiene paraphernalia cabinet is closed by sliding door 8 and the remaining portion for storage of towels and other incidential articles such as measuring spoons, etc., is closed by sliding door 9. It will be noticed particularly in FIGS. 2 and 3 that the irrigation vessel 19 may be rotated approximately 90° so that the spout 21 projects beyond the cabinet door 8 in use and may be moved to the side and completely within the cabinet when not in use. Likewise, the vessel 19 may be completely removed from the cabinet for cleaning or replacement. Particularly in FIGS. 2 and 4 the shelving arrangement provides free access to the bottom 4 of the cabinet, and additional removable trays may be provided as desired.

It will be understood that the feminine hygiene cabinet appertaining to the invention provides convenient water supply facilities and a removable mixing and irrigation vessel which permits convenient access to the necessary facilities for feminine hygiene. The cabinet includes various storage facilities for all the necessary paraphernalia associated with feminine hygiene. The cabinet may be of plastic material with sliding doors that permit access to the sanitary articles and facilities when slid to one side and permits access to towel and other storage when slid to the other side. It will be understood that the particular arrangement of the compartments and the water supply facilities may be modified in various ways which will be readily apparent from the foregoing. Moreover, it will be appreciated that the invention includes the convenient water supply and removable vessel facilities in the cabinet. The cabinet is readily attached by conventional mounting to a bath room wall, and may be conventionally attached in the area of the bathtub. Moreover, it will be apparent that the entire cabinet facility could be recessed in a wall convenient to the bath tub or other areas of the bathroom. The hot and cold water facilities may be conveniently connected to conventional fittings.

It will be appreciated that various modifications and changes may be made to the feminine hygiene cabinet appertaining to the invention and all such changes and modifications are deemed to be within the scope and spirit of the invention as defined in the appended claims.

What is claimed is:

1. A feminine hygiene cabinet comprising a cabinet structure having a back, a top wall, a bottom wall, sides, and a door member for closable access to said structure, water supply facilities mounted to the back at one side of the cabinet structure, a vessel having a side wall and a relatively flat bottom portion and having a drain spout extending outwardly from the side wall at the bottom of said vessel, a fixed holder mounted to the bottom of said cabinet structure beneath said supply facilities having a slot portion, said vessel removably retained by said holder with the drain spout received in said slot portion, said slot portion permitting rotation of said bowl in said holder through a limited arc to position said drain spout between storage and convenience positions.

2. A feminine hygiene cabinet comprising a cabinet structure having a back, a top wall, a bottom wall and sides, water supply facilities mounted to the back at one side of the cabinet structure, an irrigation vessel having a side wall and a relatively flat bottom portion and having a drain spout extending outwardly from the side wall at the bottom of said vessel, a fixed holder mounted to the bottom of said cabinet structure beneath said supply facilities having a slot portion, said vessel removably retained by said holder with the drain spout received in said slot portion, said slot portion permitting rotation of said bowl to position said drain spout between storage and convenience positions.

3. A feminine hygiene cabinet comprising a cabinet struture having a back, a top wall, a bottom and sides, water supply facilities mounted to the back at one side of the cabinet structure, a vessel having a side wall and a relatively flat bottom portion, a drain spout extending outwardly from the side wall as the bottom of said vessel, a fixed holder mounted to the bottom of said cabinet structure beneath said supply facilities having a cut-away portion, said vessel removably retained by said holder with the drain spout received in said cut-away portion, said cut-away portion permitting rotation of said bowl between a storage position and a convenience position, and a removable tray positioned on the bottom near said fixed holder to store feminine hygiene articles.

4. A feminine hygiene cabinet comprising a cabinet structure having a back, a top wall, a bottom wall and sides, water supply facilities mounted to the back at one side of the cabinet structure, an irrigation vessel having a side wall and a relatively flat bottom, a drain spout extending outwardly from the side wall at the bottom of said vessel, a fixed holder mounted to the bottom of said cabinet structure beneath said supply facilities having a slot portion, said vessel removably retained by said holder with the drain spout received in said slot portion, said slot portion permitting movement of said vessel between a storage position and a convenience position and at least one compartment formed at the other side of the cabinet structure in the upper portion thereof.

5. The feminine hygiene cabinet of claim 4 including at least one storage tray for storing irrigation tubes and pipes with said tube communicating with said spout, a removable clamp secured to said tube near the spout for controlling the flow from said vessel through said tube and pipe.

6. A feminine hygiene cabinet of claim 1 including additional compartments at the other side of the cabinet for storing feminine hygiene products.

References Cited by the Examiner

UNITED STATES PATENTS

| 703,616 | 7/1902 | Schwartz | 128—241 |
| 999,602 | 8/1911 | Slee | 222—185 |
| 1,595,791 | 8/1926 | Lantieri | 312—209 |
| 3,008,785 | 11/1961 | Gehrs | 312—209 |
| 3,178,061 | 4/1965 | Giacalone | 222—76 |

CLAUDE A. LE ROY, *Primary Examiner.*

CHANCELLOR E. HARRIS, *Examiner.*